(12) United States Patent
Bellis et al.

(10) Patent No.: US 10,706,565 B2
(45) Date of Patent: Jul. 7, 2020

(54) METHOD AND APPARATUS FOR MOTION TRACKING OF AN OBJECT AND ACQUISITION OF THREE-DIMENSIONAL DATA OVER LARGE AREAS

(71) Applicant: Seikowave, Inc., Lexington, KY (US)

(72) Inventors: Matthew W Bellis, Lexington, KY (US); Eli Ross Crane, Lexington, KY (US)

(73) Assignee: Seikowave, Inc., Lexington, KY (US)

( * ) Notice: Subject to any disclaimer, the term of this patent is extended or adjusted under 35 U.S.C. 154(b) by 0 days.

(21) Appl. No.: 15/662,264

(22) Filed: Jul. 27, 2017

(65) Prior Publication Data
US 2018/0165816 A1 Jun. 14, 2018

Related U.S. Application Data

(60) Provisional application No. 62/367,579, filed on Jul. 27, 2016.

(51) Int. Cl.
| | |
|---|---|
| *G06K 9/00* | (2006.01) |
| *G06T 7/292* | (2017.01) |
| *G06T 7/37* | (2017.01) |
| *G06T 7/33* | (2017.01) |
| *G06T 7/20* | (2017.01) |
| *G06T 7/55* | (2017.01) |
| *G05D 1/02* | (2020.01) |

(52) U.S. Cl.
CPC ............... *G06T 7/292* (2017.01); *G06T 7/20* (2013.01); *G06T 7/33* (2017.01); *G06T 7/37* (2017.01); *G06T 7/55* (2017.01); *G05D 1/0234* (2013.01); *G05D 1/0251* (2013.01); *G06T 2207/10021* (2013.01); *G06T 2207/10028* (2013.01); *G06T 2207/30204* (2013.01); *G06T 2207/30241* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 6,675,040 B1 * | 1/2004 | Cosman | G06T 3/00 600/427 |
| 8,886,387 B1 * | 11/2014 | Agarwal | G05D 1/0253 701/28 |

(Continued)

*Primary Examiner* — Stephen P Coleman
(74) *Attorney, Agent, or Firm* — Macheledt Bales LLP

(57) ABSTRACT

A multi-dimensional solution directed to employment of a low-resolution motion tracking technique to estimate a homogeneous transformation matrix that is further adapted to accurately characterize movement/motion between successive positions of an object through time. Low-resolution tracking is first used to estimate a homogeneous transformation matrix that describes the motion between successive positions of an object as that object moves over time. The 3-dimensional imaging data is then used to calculate a more accurate homogeneous transformation matrix, providing the accuracy to better characterize motion of the object over time. In the case where the 'object' being tracked is a 3-dimensional imaging system (herein, 3DIS), the resulting homogeneous transformation matrix is used to create 3-dimensional digital models of the scene that is in the field-of-view of the 3-dimensional imaging system (3DIS).

15 Claims, 14 Drawing Sheets

(56) References Cited

U.S. PATENT DOCUMENTS

| | | | | |
|---|---|---|---|---|
| 2003/0210812 A1* | 11/2003 | Khamene | ............... | A61B 90/36 |
| | | | | 382/128 |
| 2005/0065649 A1* | 3/2005 | Rosenfeld | ............ | G05D 1/0231 |
| | | | | 700/245 |
| 2010/0318223 A1* | 12/2010 | Motoyoshi | ............. | B25J 9/1638 |
| | | | | 700/253 |
| 2015/0032260 A1* | 1/2015 | Yoon | ..................... | A47L 9/2857 |
| | | | | 700/257 |
| 2016/0110885 A1* | 4/2016 | Blasch | .................. | G06T 7/2066 |
| | | | | 382/103 |
| 2017/0091952 A1* | 3/2017 | Sun | ........................... | G06T 5/10 |

* cited by examiner

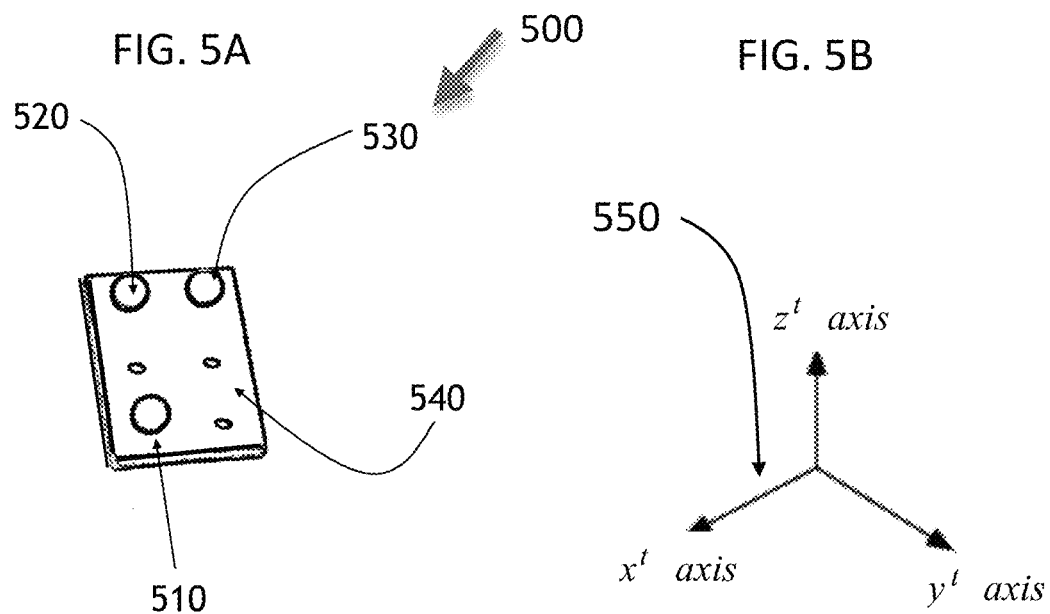
FIG. 5A
FIG. 5B
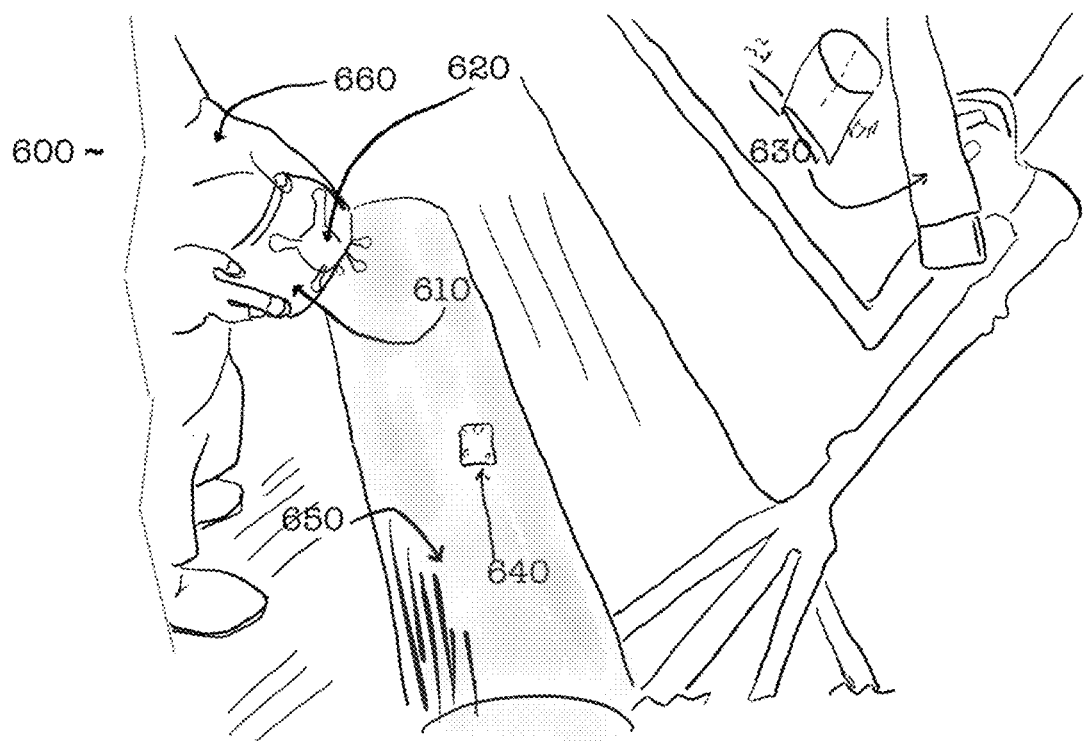
FIG. 6

METHOD AND APPARATUS FOR MOTION TRACKING OF AN OBJECT AND ACQUISITION OF THREE-DIMENSIONAL DATA OVER LARGE AREAS

CROSS REFERENCE TO RELATED APPLICATION(S)

This application claims benefit under 35 U.S.C. 119(e) of pending U.S. Provisional Application No. 62/367,579 filed 27 Jul. 2016 by the applicant and named inventors hereof, the complete disclosure of which—including examples and sketches—is incorporated herein by reference, to the extent the disclosure of the co-pending U.S. provisional application provides support and edification of this technical disclosure.

FIELD OF THE INVENTION

In general, the invention relates to motion tracking of objects and to the acquisition of accurate three-dimensional data over larges areas.

BACKGROUND OF THE INVENTION

Tracking the motion of objects is a common problem encountered in many fields. A variety of techniques have been used to determine the position of an object as that object moves through space.

Optical flow and its derivatives can be used to track the motion of an object. In optical flow, motion is calculated by comparing successive two-dimensional (referred to herein, alternatively, as "2-dimensional" or "2-D") images. The images can either be acquired by a camera located on the object that is in motion or acquired by a camera that is viewing the scene in which the object in motion appears. In the first case, the pixel shift in the 2-dimensional images corresponds to the motion of the object. In the second case, the pixel shift of the object within the field of view of the 2-dimensional camera corresponds to the motion of the object. In either case, the translation of the object and the rotation of the object need to be inferred from the pixel shift. Because a conventional 2-dimensional image system projects all of the data in a scene onto a flat plane (the image sensor), calculation of the translation and rotation in three-dimensional (referred to herein, alternatively, as "3-dimensional" or "3-D") space is difficult. It is known that this calculation can be improved by placing markers on the object in motion at known relative positions. Placing multiple spherical markers on the object in motion at known relative positions improves the ability to detect rotation of the object.

BACKGROUND OF THE INVENTION: TECHNOLOGICAL HISTORY

By way of general technical background in connection with the instant technical disclosure, the following background information is offered to aid in outlining some of the challenges of current systems and technologies. EXHIBITS A and B, downloaded from optitrack.com for print on 26 Jul. 2017 for inclusion herewith as background reference, only, outlining specifications and features currently being distributed by NaturalPoint, Inc. d/b/a OptiTrack™, as noted. EXHIBIT C constitutes background of tracking system technology branded as an Omnitrac 2™ laser tracker, downloaded from apisensor.com (Rockville, Md. 20850) and printed 27 Jul. 2017 for inclusion herewith as background reference, only, outlining specifications and features thereof. EXHIBIT D constitutes background of tracking system technology branded as PATRIOT™ and LIBERTY™ by polhemus.com, downloaded at cadengineering.co.in (Greater Noida-201310, India) and printed 27 Jul. 2017 for inclusion herewith as background reference, only, outlining specifications and features thereof. EXHIBIT E constitutes background of tracking system technology branded by Intel® as RealSense™ Camera ZR300—Series tracking, object recognition, and simultaneous localization and mapping, downloaded from software.intel.com/en-us/RealSense/ZR300Camera and printed 27 Jul. 2017 for inclusion herewith as background reference, only, outlining specifications and features thereof.

SUMMARY OF THE INVENTION

One will appreciate that certain unique features and combinations of features, subassemblies, and structures supported and disclosed, herein, create a flexible solution that—unlike conventional solutions—achieves higher performance motion tracking.

As shown and described throughout, the multi-dimensional invention is directed to a unique method that employs a low-resolution motion tracking technique to estimate a homogeneous transformation matrix adapted to accurately characterize movement/motion between successive positions of an object through time.

Preferably, the low-resolution motion tracking technique is based on optical flow or similar technique. The resolution of tracked motion obtaining from a portable scan unit is improved by incorporating 3-dimensional data into the process. Low-resolution tracking is first used to estimate a homogeneous transformation matrix that describes the motion between successive positions of an object as that object moves over time. The 3-dimensional imaging data is then used to calculate a more accurate homogeneous transformation matrix ("T") providing sufficient accuracy to better characterize motion of the object over time. In the case where the 'object' being tracked is a 3-dimensional imaging system (elsewhere, herein, 3DIS), the resulting homogeneous transformation matrix is used to create 3-dimensional digital models of the scene that is in the field-of-view of the 3-dimensional imaging system (3DIS).

BRIEF DESCRIPTION OF DRAWINGS

For purposes of illustrating the innovative nature, plus flexibility and genius of design and versatility of the new method and associated system, figures are included (in which like numerals, where included, designate like parts). While each figure is labeled conventionally as "FIG.", as one will appreciate throughout this disclosure, the word figure and "FIG." are used interchangeably. One can appreciate the advantages and novel features that distinguish the instant invention from conventional or current systems, techniques, and approaches. The figures as well as any incorporated technical materials have been included to communicate features of the innovation by way of example, only, and are in no way intended to unduly limit the disclosure hereof.

FIG. 2 has been labeled PRIOR ART as it depicts a MTS having features of a low-resolution, low-accuracy, real-time motion tracking system currently available from OptiTrack, and outlined in EXHIBIT A hereof.

FIG. 5 (composed of FIGS. 5A, 5B) is a sketch of a calibration system that enables determination of the offset matrix between the coordinate system of the 3DIS and the MTS.

FIG. 6 is a sketch depicting elements of a calibration process.

DESCRIPTION DETAILING FEATURES OF THE INVENTION

By viewing the figures and any technical reference materials incorporated by reference herein, one can further appreciate the unique and extraordinary nature of preferred and alternative preferred features of the new technique/process and system—along with associated apparatus, subassembly, and component structures. Back-and-forth reference and association has been made to various features and components represented by, or identified in, the figures. Structural and functional details are shown schematically by way of example only—to showcase and highlight the genius and rigor behind the unique design of inventive collaborators' system and technique/process along with subsystems, subassemblies, components, and units contemplated by this technical disclosure.

Figure 1:
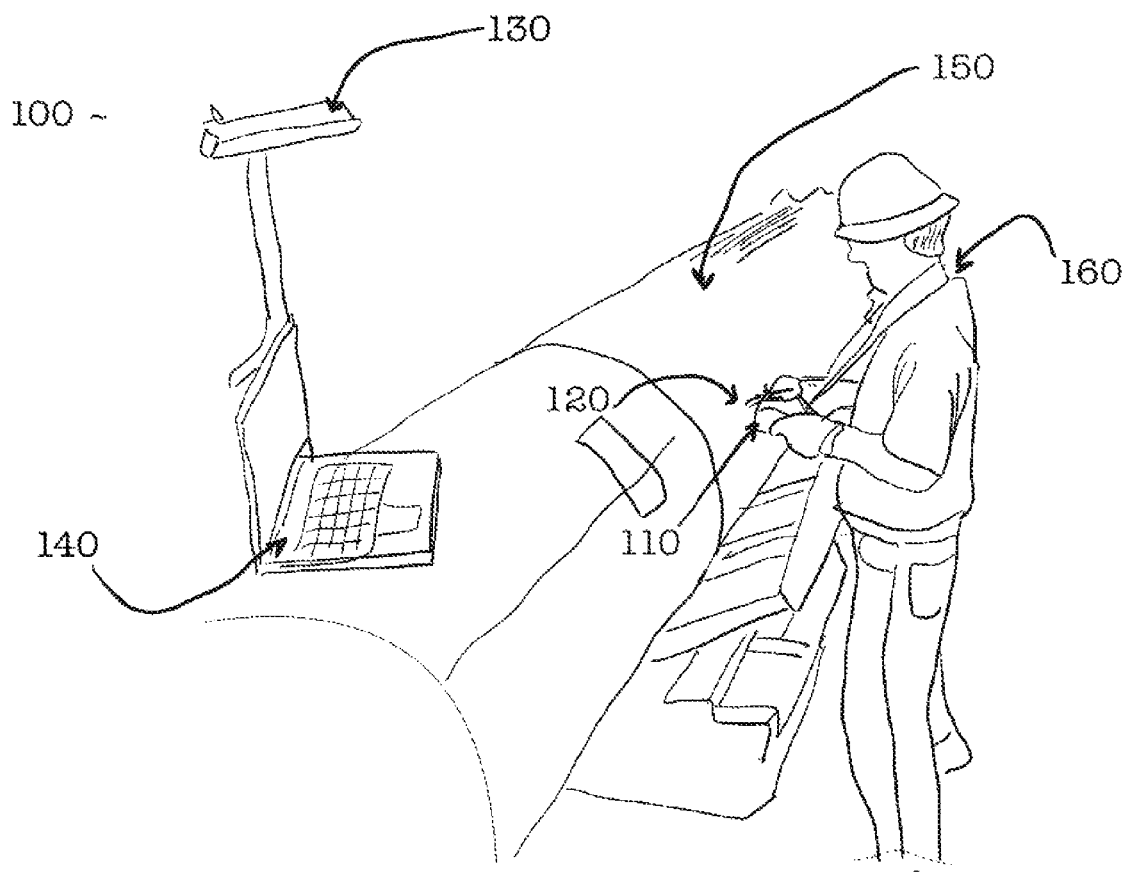
FIG. 1 is a sketch (pictorial perspective) of features/elements adapted for enhanced-accuracy, real-time motion tracking and 3-dimensional image acquisition for a large area.
Figure 2:
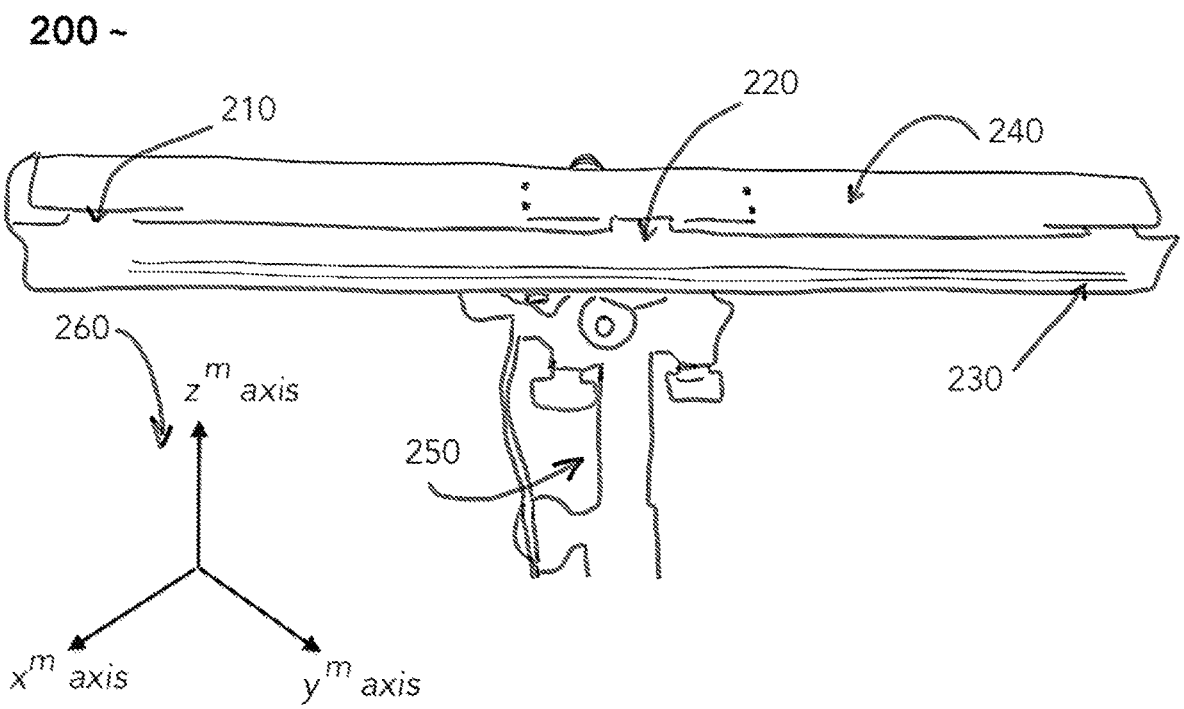
FIG. 2 is a depiction of a suitable motion tracking system (or, MTS)
Figure 3:
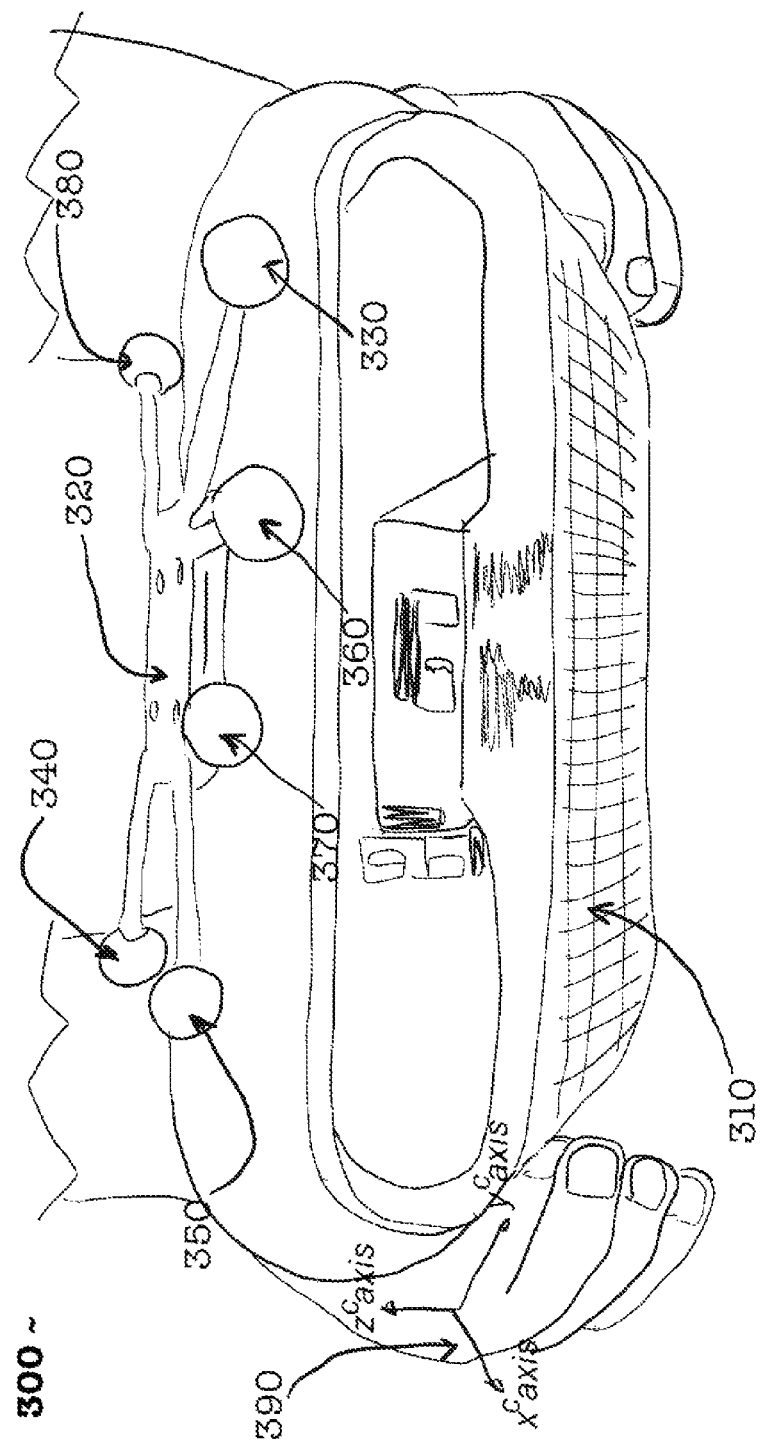
FIG. 3 is a front perspective view of a 3-dimensional imaging system (3DIS) that has spherical markers to facilitated motion tracking.

Below, for handy reference, elements/components/features labeled in FIGS. 1-8 are itemized in a unique spreadsheet format. This format was chosen merely to facilitate understanding of contemplated features associated with identified assembly drawings—it is in no way intended to limit structure, placement, or function of elements and features. Information for each element is included and listed under columns in the spreadsheet as titled: "Figure#|assembly#" (Figure/FIG. 1 depicts assembly 100, Figure/FIG. 2 depicts assembly 200, Figure/FIG. 3 depicts assembly 300, and so on); "Item#" (functions as the reference numeral/number); "Name" (a shorthand version of General Description, often an acronym); "General Description" (coordinated with an element Name in such a way that similarly situated elements, from figure to figure throughout the drawings, will share a common Name, but not the same "Item#"); and "Referenced Embodiment" (common descriptors are used to identify key subassemblies).

| FIG. # assembly# | Item# | Name | General Description | Referenced Embodiment |
|---|---|---|---|---|
| FIG. 1 100 | 110 | 3DIS | Three-dimensional imaging system | 3D structured light imaging system |
| FIG. 1 100 | 120 | RB | Rigid body | rigid body comprising of six spheres held at six distinct locations |
| FIG. 1 100 | 130 | MTS | Motion tracking system | System of three cameras |

-continued

Figure 4:
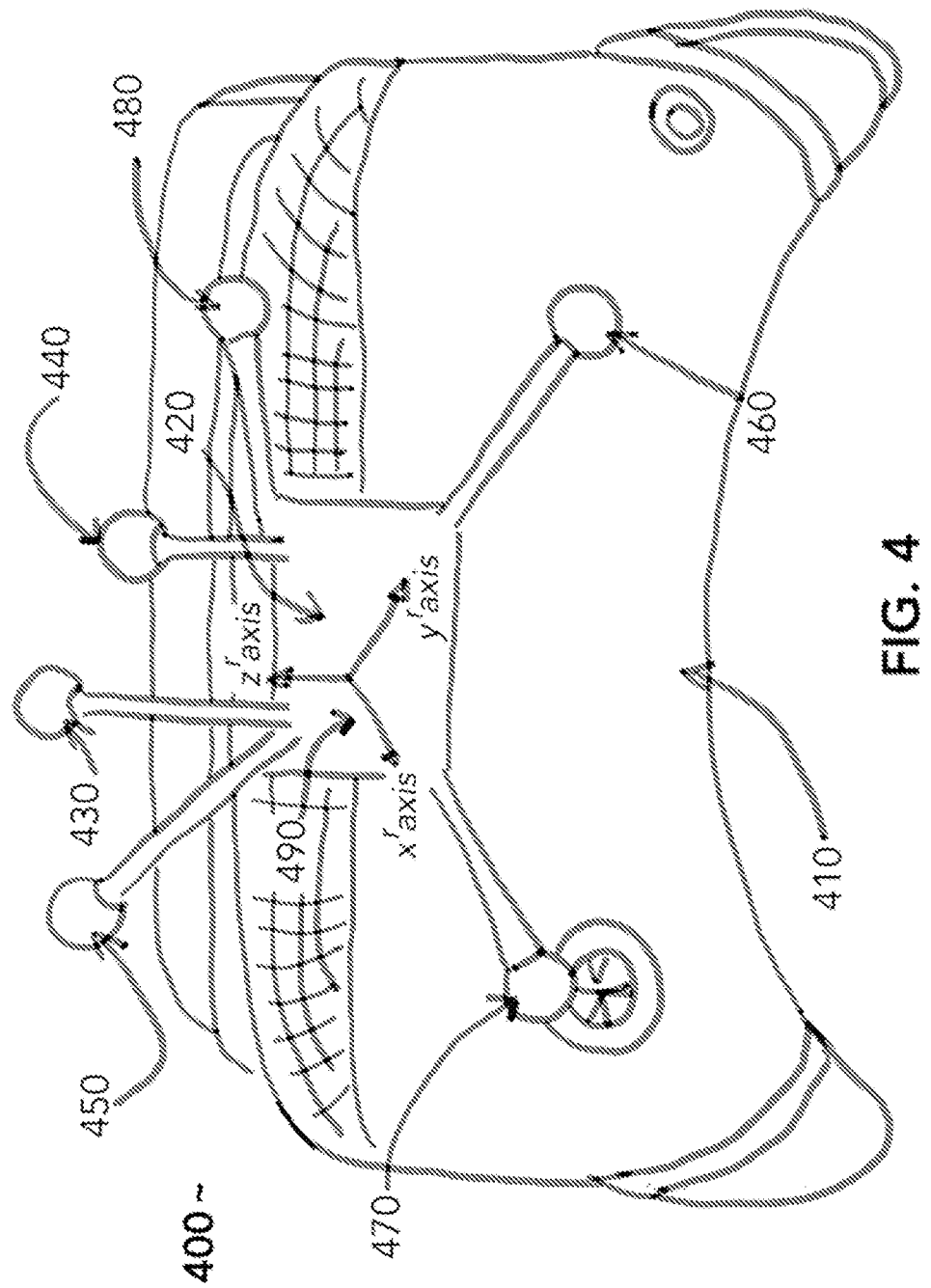
FIG. 4 is a top view drawing of a 3-dimensional imaging system (3DIS) that has spherical markers to facilitated motion tracking.

| FIG. # assembly# | Item# | Name | General Description | Referenced Embodiment |
|---|---|---|---|---|
| FIG. 1 100 | 140 | SC | System controller | Laptop computer |
| FIG. 1 100 | 150 | SUI | Scene under inspection | Pipeline |
| FIG. 1 100 | 160 | Human operator | Human operator | Human operator |
| FIG. 2 200 | 210 | C1 | First camera | First camera using a CMOS sensor with 640 × 480 resolution |
| FIG. 2 200 | 220 | C2 | Second camera | Second camera using a CMOS sensor with 640 × 480 resolution |
| FIG. 2 200 | 230 | C3 | Third camera | Third camera using a CMOS sensor with 640 × 480 resolution |
| FIG. 2 200 | 240 | MTH | Housing | Housing |
| FIG. 2 200 | 250 | MS | Mounting system | Tripod |
| FIG. 2 200 | 260 | MTS-CS | Motion tracking system coordinate system illustrating $x^m$, $y^m$, and $z^m$ axes | Motion tracking system Cartesian coordinate system |
| FIG. 3 300 | 310 | 3DIS | Three-dimensional imaging system | 3D structured light imaging system |
| FIG. 3 300 | 320 | RB | Rigid body | Rigid body comprising of six spheres held at six distinct locations |
| FIG. 3 300 | 330 | RB1 | First marker on rigid body used to identify a single point associated with the rigid body | First spherical marker on rigid body used to identify a single point associated with the rigid body |
| FIG. 3 300 | 340 | RB2 | Second marker on rigid body used to identify a single point associated with the rigid body | Second spherical marker on rigid body used to identify a single point associated with the rigid body |
| FIG. 3 300 | 350 | RB3 | Third marker on rigid body used to identify a single point associated with the rigid body | Third spherical marker on rigid body used to identify a single point associated with the rigid body |
| FIG. 3 300 | 360 | RB4 | Fourth marker on rigid body used to identify a single point associated with the rigid body | fourth spherical marker on rigid body used to identify a single point associated with the rigid body |
| FIG. 3 300 | 370 | RB5 | Fifth marker on rigid body used to identify a single point associated with the rigid body | Fifth spherical marker on rigid body used to identify a single point associated with the rigid body |
| FIG. 3 300 | 380 | RB6 | Sixth marker on rigid body used to identify a single point associated with the rigid body | Sixth spherical marker on rigid body used to identify a single point associated with the rigid body |
| FIG. 3 300 | 390 | 3DIS-CS | Three-dimensional imaging system coordinate system illustrating $x^c$, $y^c$, and $z^c$ axes | 3D structured light imaging system Cartesian coordinate system |
| FIG. 4 400 | 410 | 3DIS | Three-dimensional imaging system | 3D structured light imaging system |
| FIG. 4 400 | 420 | RB | Rigid body | rigid body comprising of six spheres held at six distinct locations |
| FIG. 4 400 | 430 | RB1 | First marker on rigid body used to identify a single point associated with the rigid body | First spherical marker on rigid body used to identify a single point associated with the rigid body |
| FIG. 4 400 | 440 | RB2 | Second marker on rigid body used to identify a single point associated with the rigid body | Second spherical marker on rigid body used to identify a single point associated with the rigid body |
| FIG. 4 400 | 450 | RB3 | Third marker on rigid body used to identify a single point associated with the rigid body | Third spherical marker on rigid body used to identify a single point associated with the rigid body |
| FIG. 4 400 | 460 | RB4 | Fourth marker on rigid body used to identify a single point associated with the rigid body | fourth spherical marker on rigid body used to identify a single point associated with the rigid body |
| FIG. 4 400 | 470 | RB5 | Fifth marker on rigid body used to identify a single point associated with the rigid body | Fifth spherical marker on rigid body used to identify a single point associated with the rigid body |
| FIG. 4 400 | 480 | RB6 | Sixth marker on rigid body used to identify a single point associated with the rigid body | Sixth spherical marker on rigid body used to identify a single point associated with the rigid body |
| FIG. 4 400 | 490 | RB-CS | Rigid body coordinate system illustrating $x^r$, $y^r$, and $z^r$ axes | Rigid body Cartesian coordinate system |
| FIG. 5A 500 | 510 | RBOCT | Rigid body offset calibration target | Rigid body offset calibration target comprising of a flat plate with three spherical markers |
| FIG. 5A 500 | 520 | RBOCT1 | First marker on rigid body offset calibration target used to identify a single point associated with the rigid body offset calibration target | First spherical marker on rigid body offset calibration target used to identify a single point associated with the rigid body offset calibration target |

-continued

Figure 7:
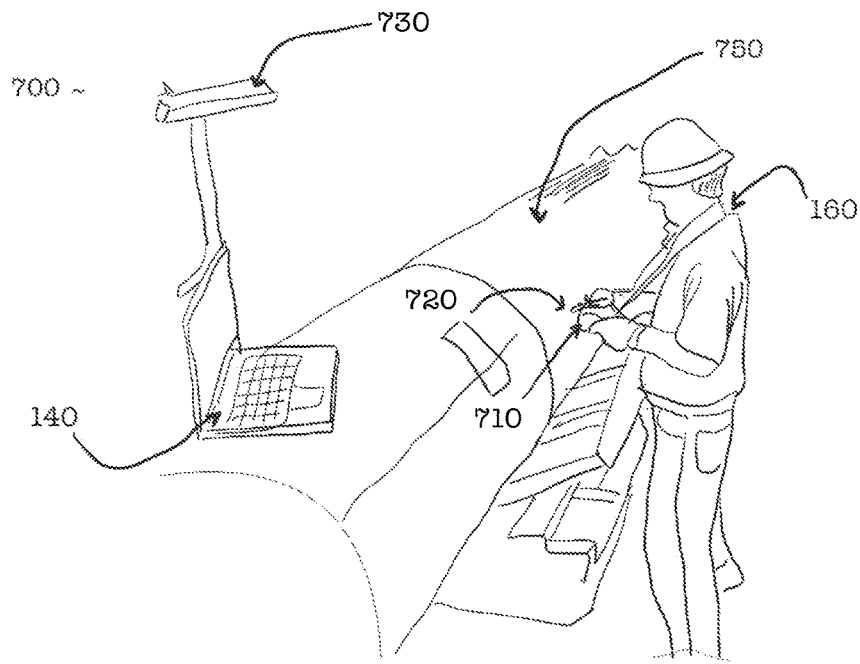
FIG. 7 is a sketch (pictorial perspective)—similar to that in FIG. 1—of features adapted for enhanced-accuracy, real-time motion tracking and 3-dimensional image acquisition intended for analyzing a large area. Features of FIG. 7 sharing commonality with FIG. 1 have been labeled (700's) to denote inclusion in FIG. 7.
Figure 8:
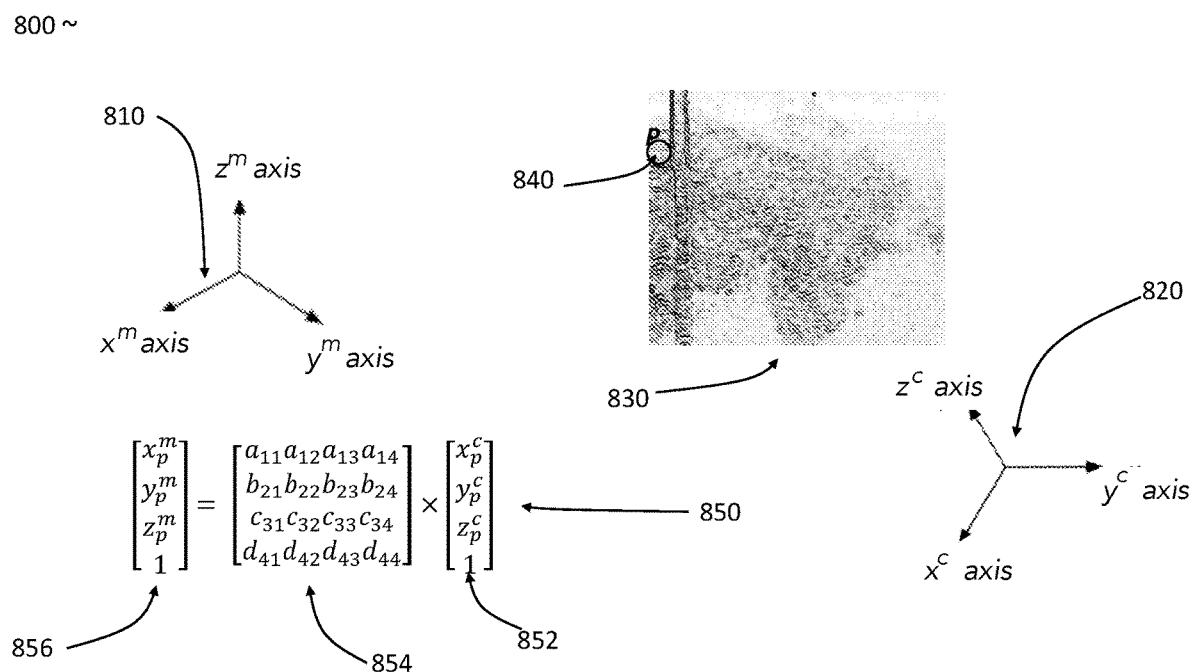
FIG. 8 graphically represents the method by which a point from the scene under inspection that is in a first 3-dimensional image is transformed from the coordinate system of the 3DIS to the coordinate system of the MTS.

| FIG. # assembly# | Item# | Name | General Description | Referenced Embodiment |
|---|---|---|---|---|
| FIG. 5A 500 | 530 | RBOCT2 | Second marker on rigid body offset calibration target used to identify a single point associated with the rigid body offset calibration target | Second spherical marker on rigid body offset calibration target used to identify a single point associated with the rigid body offset calibration target |
| FIG. 5A 500 | 540 | RBOCT3 | Third marker on rigid body offset calibration target used to identify a single point associated with the rigid body offset calibration target | Third spherical marker on rigid body offset calibration target used to identify a single point associated with the rigid body offset calibration target |
| FIG. 5B | 550 | RBOCT-CS | Rigid body offset calibration target coordinate system with $x^r$, $y^r$, & $z^r$ axes | Rigid body offset calibration target Cartesian coordinate system |
| FIG. 6 600 | 610 | 3DIS | Three-dimensional imaging system | 3D structured light imaging system |
| FIG. 6 600 | 620 | RB | Rigid body | rigid body comprising of six spheres held at six distinct locations |
| FIG. 6 600 | 630 | MTS | Motion tracking system | System of three cameras |
| FIG. 6 600 | 640 | RBOCT | Rigid body offset calibration target | Rigid body offset calibration target comprising of a flat plate with three spherical markers |
| FIG. 6 | 650 | OUI | Scene under inspection | Pipeline |
| FIG. 6 600 | 660 | Human operator | Human operator | Human operator |
| FIG. 7 700 | 710 | 3DIS | Three-dimensional imaging system with accelerometer | 3D structured light imaging system |
| FIG. 7 700 | 720 | RB | Rigid body | rigid body comprising of six spheres held at six distinct locations |
| FIG. 7 700 | 730 | MTS | Motion tracking system | System of three cameras |
| FIG. 7 700 | 750 | SUI | Scene under inspection | Pipeline |
| FIG. 8 800 | 810 | MTS-CS | Motion tracking system coordinate system illustrating $x^m$, $y^m$, and $z^m$ axes | Motion tracking system Cartesian coordinate system |
| FIG. 8 800 | 820 | 3DIS-CS | Three-dimensional imaging system coordinate system illustrating $x^c$, $y^c$, and $z^c$ axes | 3D structured light imaging system Cartesian coordinate system |
| FIG. 8 800 | 830 | 3DI | Three-dimensional image | Three-dimensional image of a pipe |
| FIG. 8 800 | 840 | 3DI-P | Point in a three-dimensional image | Point in a three-dimensional image of a pipe |
| FIG. 8 800 | 850 | 3DIS-MTS-CC | Coordinate conversion from the 3DIS coordinate system to the MTS coordinate system | Matrix fromulation of the coordinate conversion from the 3DIS coordiante system to the MTS coordinate system |
| FIG. 8 800 | 852 | M3DI-P | Mathematical representation of a point in a three-dimensional image in the 3DIS coordinate system | Vector representation of a point in a three-dimensional image of a pipe in the 3DIS coordinate system |
| FIG. 8 800 | 854 | HTM-3DIS-MTS | Mathematical representation of the transformation from | |
| FIG. 8 800 | 856 | MMTS-P | Mathematical representation of a point in a three-dimensional image in the MTS coordinate system | Vector representation of a point in a three-dimensional image of a pipe in the MTS coordinate system |

FIG. 1 depicts a system 100 for determining motion of an object and accurately calculating the 3-dimensional shape of a large scene. As shown, the system includes a high-resolution 3-dimensional imaging system unit (3DIS) 110, a rigid body (RB) 120, a low-resolution motion tracking system (MTS) 130, a system controller (or processing unit) 140, a scene under inspection 150, and an operator 160, here shown to be a human. See also, FIG. 12, which represents a system 1200 wherein the human operator 160 of FIG. 1 is replaced with an unmanned unit such as mobile robotic vehicle 1270, by way of example only.

In FIG. 1, a human operator 160 is holding 3DIS 110. The MTS 130 is tracking the position of the 3DIS unit 110 by means of the RB 120 which is attached by suitable fixture and fasteners to the 3DIS 110. The human operator 160 is moving the 3DIS unit 110. Structural details of 3DIS unit 110 are highlighted in connection with FIG. 3 (the unit labeled 310) and in FIG. 4 at 410. By way of further reference as shown in the drawings: in FIG. 6 the 3DIS unit is labeled 610, in FIG. 7 the 3DIS unit is labeled 710, and in FIG. 12 the 3DIS unit is labeled 1210.

The object in motion that is being tracked throughout a scene under inspection 150 is referred to throughout as a rigid body (RB). By way of reference as shown in the drawings: the rigid body (RB) is labeled 120 in FIG. 1, is labeled 320 in FIG. 3, labeled 420, FIG. 4, 620 in FIG. 6, 720 in FIG. 7, and 1220 in FIG. 12. Each rigid body (RB), by way of example, has a multitude (six) of spherical markers as labeled in FIG. 3: 330, 340, 350, 360, 370, and 380. While the end-shapes are shown as spherical (330, 340, 350, 360, 370, 380 in FIG. 3, and 430, 440, 450, 460, 470, 480 in FIG. 4) the end-shapes need not be spherical. Preferably, each shape has at least one marker for motion tracking.

The 3DIS unit, such as those shown at 110, 310, 410, 610, 710, and 1210, performs a function of acquiring 3-dimensional image data. Returning to FIG. 1: system controller 140—a processing unit—uses a unique combination of the low-resolution motion tracking data from the MTS 130 and the high-resolution three-dimensional image data from the 3DIS 110 for motion tracking of the object in motion—and as explained elsewhere, here the 3DIS 110 functions as the object-in-motion—to create a high-resolution 3-dimensional image of the entire scene under inspection 150.

FIG. 2 shows an embodiment of the low-resolution, high-speed motion tracking system (MTS) 200. By way of reference to other figures as itemized in the spreadsheet: in FIG. 1 the MTS is labeled 130, in FIG. 6 the MTS is labeled 630, and in FIG. 7 the MTS is labeled 730. An MTS 200 comprises at least one two-dimensional camera (C1) 210 with additional two-dimensional cameras (C2) 220 and (C3) 230. The combination of the field of view for C1 210, C2 220, and C3 230 results in the overall field of view of the MTS 200. The two-dimensional cameras C1 210, C2 220, and C3 230 are enclosed in a housing 240. A housing 240 is connected to a tripod 250. The coordinate system of the MTS 200 is shown in 260 ($x^m$, $y^m$, and $z^m$ axes). The superscript m is attached to the three Cartesian axes of the MTS coordinate system (MTS-CS) 260 ($x^m$, $y^m$, and $z^m$ axes) to indicate that this is the coordinate system of the MTS 200.

Figure 19:
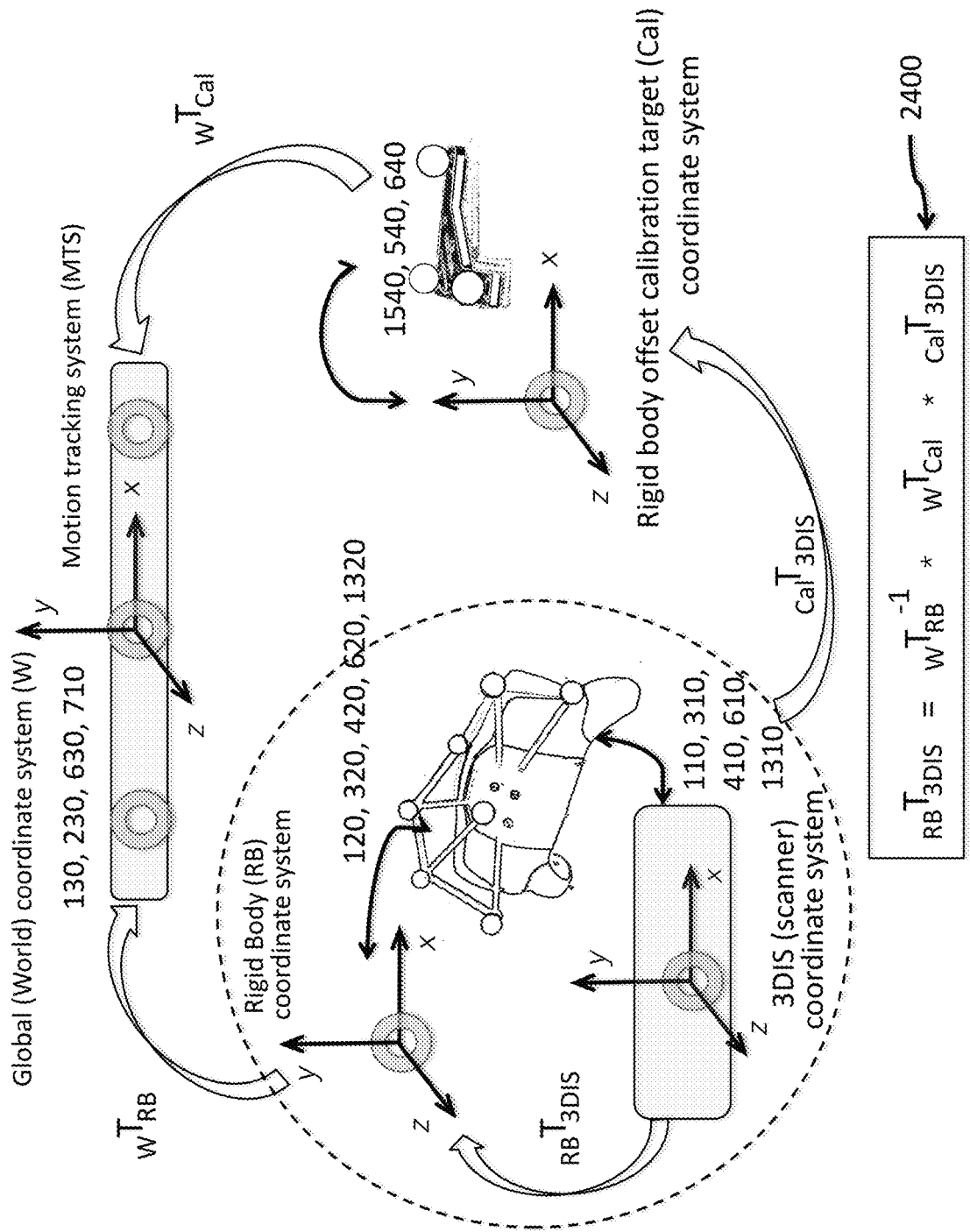
FIGS. 19 and 20 schematically depict features of the invention, in particular, elements from other figures are referenced to provide an overall understanding of the genius of the method/process, system, and employment of conventional elements along with new and unique features and components of the invention.
Figure 20:
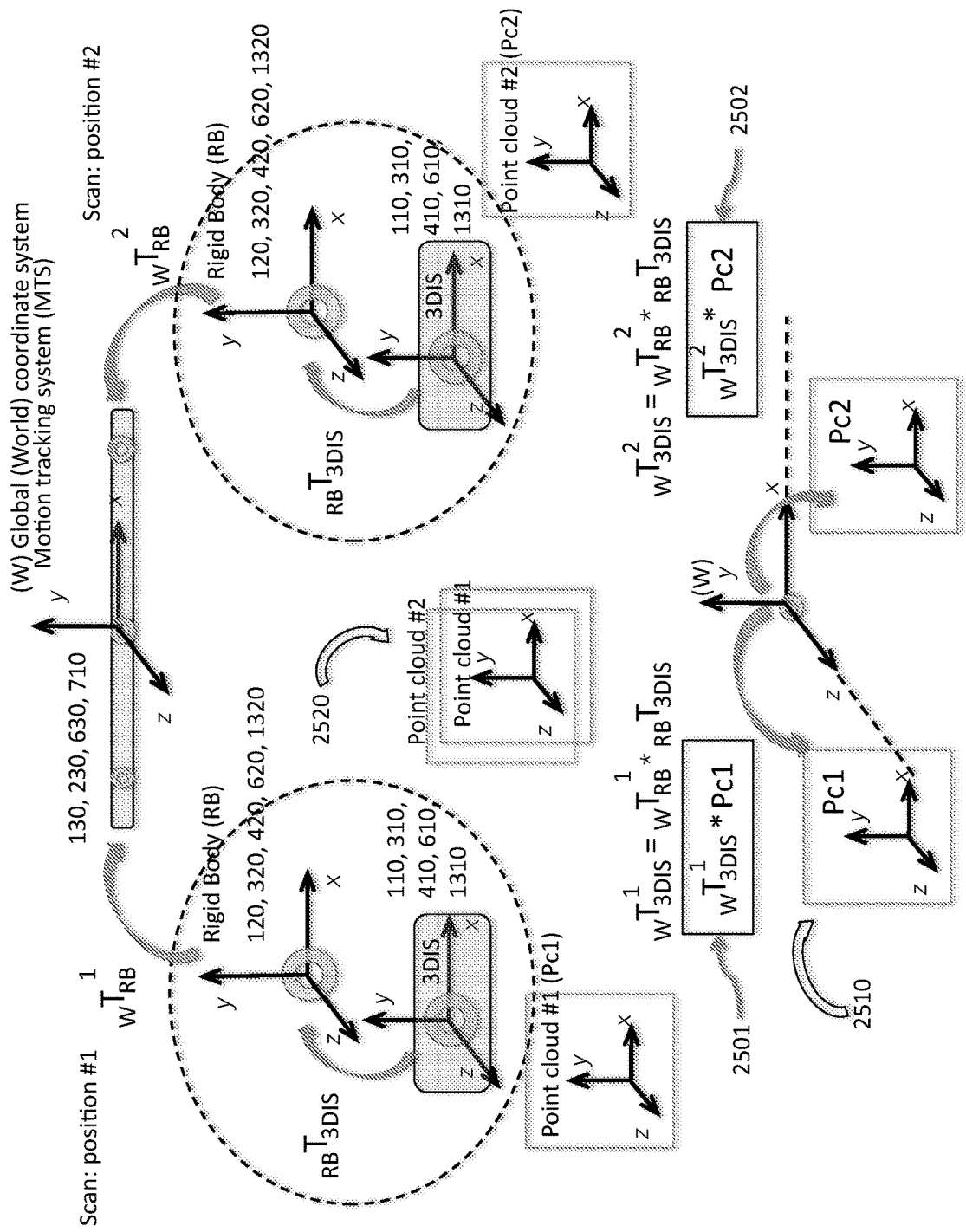
Figure 21:
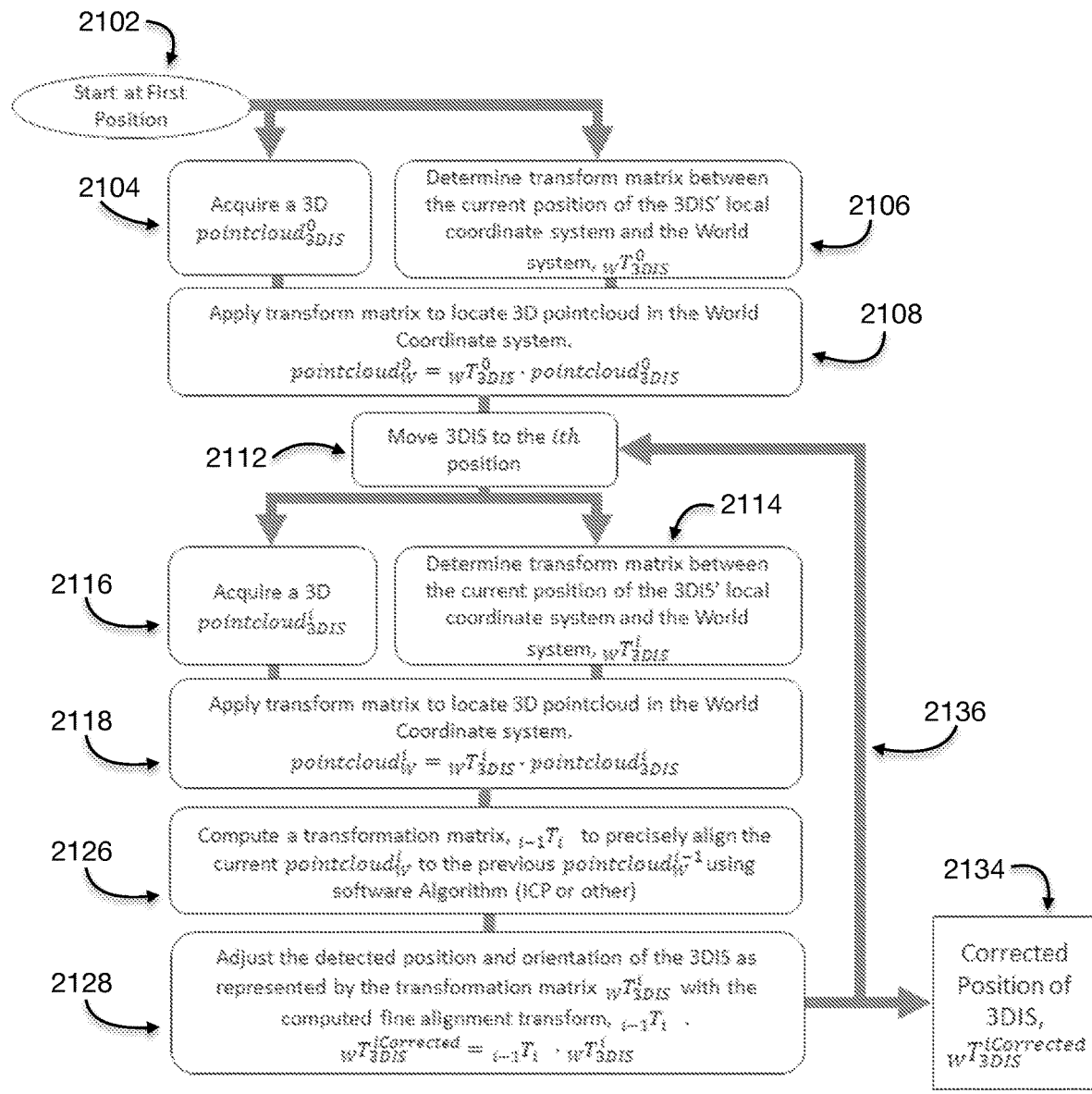
FIG. 21 is a flow diagram referencing a process of the invention 2100 utilizing new and unique components to carry out innovative computational process steps according to the invention.

The MTS and the Markers form a set of components that together track the 3DIS and locate the 3DIS in a 3D world (W) or global coordinate system, see also FIGS. 19, 20, and 21. Specifically when employing an Optitrack system such as that shown in FIG. 1 at 130, FIG. 2 at 200, FIG. 6 at 630, and FIG. 13 at 1330 (also, EXHIBITS A and B), this is achieved through a Near-Infra Red ("NIR") imaging system that utilizes motion tracking of NIR Reflective markers, but the tracking of the 3DIS could be performed with other technologies. Alternatively, other 3D tracking systems suitable for use include commercially available hardware components or software such as: the 3D laser trackers detailed in EXHIBIT C (apisensor.com), electromagnetic 3D motion trackers such as those found at cadengineering.co.in and detailed in EXHIBIT D, and/or 3D imaging systems utilizing machine vision algorithms for object recognition branded by Intel® as RealSense™ Camera ZR300—Series, referenced in EXHIBIT E.

FIG. 3 is a front view drawing of the three-dimensional imaging system (3DIS) 310 and the rigid body (RB) 320 with markers for motion tracking 300. As also explained elsewhere, RB 320 has six spherical markers labeled 330, 340, 350, 360, 370, and 380 (see also FIG. 4 at 430, 440, 450, 460, 470, and 480). The spherical markers are preferably mounted at known positions relative to each other. The 3DIS 310 coordinate system 390 ($x^c$, $y^c$, and $z^c$ axes) is a Cartesian coordinate system. The superscript c is attached to the three Cartesian axes of the 3DIS coordinate system (3DIS-CS) 390 ($x^c$, $y^c$, and $z^c$ axes) to indicate that this is the coordinate system of the 3DIS 310.

FIG. 4 is a top view drawing of the three-dimensional imaging system (3DIS) 410 and the rigid body (RB) 420 with markers for motion tracking 400. As explained elsewhere, RB 340 has six spherical markers labeled 430, 440, 450, 460, 470, and 480. The spherical markers are mounted at known positions relative to each other. The RB 420 coordinate system 490 ($x^r$, $y^r$, and $z^r$ axes) is a Cartesian coordinate system. The superscript r is attached to the three Cartesian axes of the RB coordinate system (RB-CS) 490 ($x^r$, $y^r$, and $z^r$ axes) to indicate that this is the coordinate system of the RB 420.

FIG. 5 (composed of FIGS. 5A, 5B) is a top view drawing with perspective of the rigid body offset calibration target (RBOCT) and coordinate system needed to determine the homogeneous transformation matrix that defines the offset between the 3DIS coordinate system 390 of FIG. 3 and the RB coordinate system 490 of FIG. 4. This embodiment comprises of a RBOCT 510 which has three spherical objects, 520, 530 and 540 mounted at known positions relative to each other. The locations of those position is defined by the RBOCT coordinate system (RBOCT-CS) 550. The superscript t is attached to the three Cartesian axes of the RBOCT-CS 550 to indicate that this is the coordinate system of the calibration target 510.

FIG. 6 is a drawing of the elements required to determine the offset between the 3DIS coordinate system 390 of FIG. 3 and the RB coordinate system 490 of FIG. 4. The 3DIS 610 with attached RB 620 is held by the human operator 660. The calibration target 610, which is more thoroughly described in FIG. 5, is placed on an object 650 that is in the field of view of both the 3DIS 610 and the MTS 630. To determine the offset between the RB 620 and the 3DIS 610, a single three-dimensional image is acquired using the 3DIS 610 of the object 650. Simultaneously, the object 650 is also view by the MTS 630. The homogenous transformation matrix, HTr→m, that converts the RB-CS 490 from FIG. 4 to the MTS-CS 260 from FIG. 2 is calculated based on data from the MTS 630. The homogenous transformation matrix, HTt→m, that converts the RBOCT-CS 550 ($x^t$, $y^t$, and $z^t$ axes) from FIG. 5 to the MTS-CS 260 from FIG. 2 is calculated based on data from the MTS 630. The homogenous transformation matrix, HTt→c, that converts the RBOCT-CS 550 ($x^t$, $y^t$, and $z^t$ axes) from FIG. 5 to the 3DIS-CS 390 from FIG. 3 is calculated based on data from the 3DIS 610. The calculation of the rigid body offset homogenous transformation matrix, HTc→r, that converts three-dimensional image data from the 3DIS-CS 390 of FIG. 3 to the RB-CS 490 of FIG. 4 can then be calculated from the previously calculated matrices: HTr→m, HTt→m and HTt→c.

FIG. 8 is a drawing that illustrates the coordinate system transformation process 800. A point 840 in a three-dimensional image 830 acquired by the 3DIS is represented by the vector 852 in equation 850. The homogeneous transformation matrix, HTt→m 854 converts the point from the 3DIS coordinate system (3DIS-CS) 820 ($x^c$, $y^c$, and $z^c$ axes) to the MTS coordinate system (MTS-CS) 810 ($x^m$, $y^m$, and $z^m$ axes). This produces the new vector representation of the point 840 shown in the vector 856. This is a general approach for transforming any point in the three-dimensional image 830 from the 3DIS-CS 820 ($x^c$, $y^c$, and $z^c$ axes) to the MTS-CS 810 ($x^m$, $y^m$, and $z^m$ axes).

Figure 9:
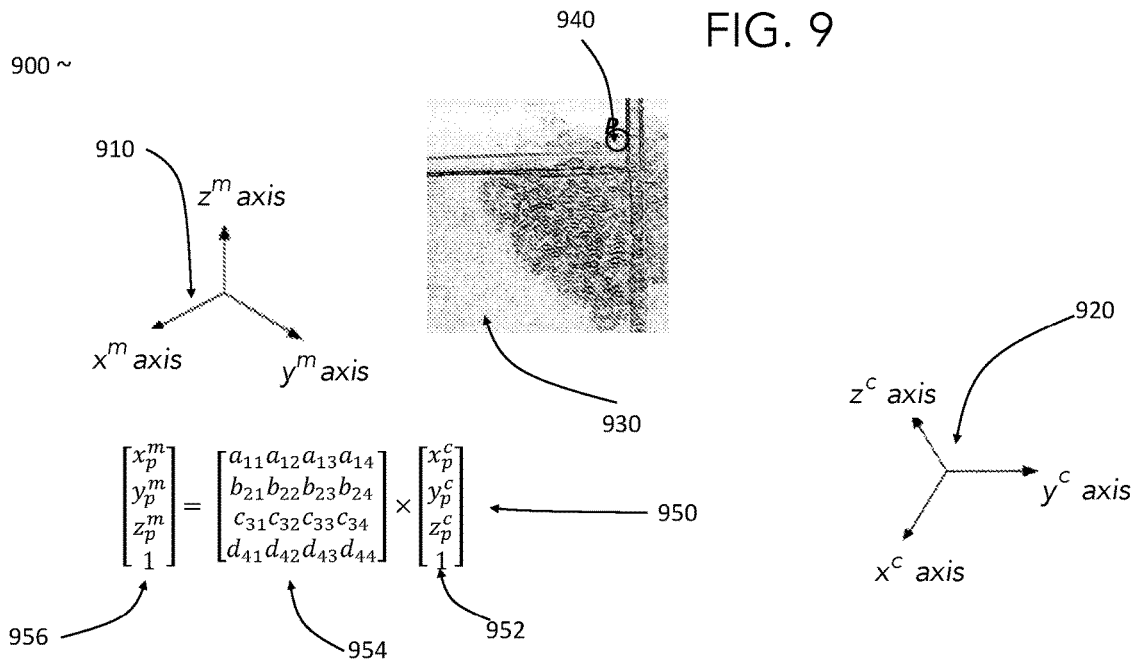
FIG. 9, in a style similar to that of FIG. 8, graphically represents the method by which a point from the scene under inspection that is the corresponding point to the point shown in FIG. 8 and is in a second 3-dimensional image is transformed from the coordinate system of the 3DIS to the coordinate system of the MTS.

FIG. 9 is a drawing that illustrates the coordinate system transformation process 900. A point 940 in a three-dimensional image 930 acquired by the 3DIS is represented by the vector 952 in equation 950. The three-dimensional image 930 overlaps the three-dimensional image 830 from FIG. 8. The point 940 is the corresponding point to the point 840 from FIG. 8. The homogeneous transformation matrix, HTt→m 954 converts the point from the 3DIS coordinate system (3DIS-CS) 920 to the MTS coordinate system (MTS-CS) 910 ($x^m$, $y^m$, and $z^m$ axes). This produces the new vector representation of the point 940 shown in the vector 956. This is a general approach for transforming any point in the three-dimensional image 930 from the 3DIS-CS 920 ($x^c$, $y^c$, and $z^c$ axes) to the MTS-CS 910 ($x^m$, $y^m$, and $z^m$ axes). The points 940 from FIGS. 9 and 840 from FIG. 8 are the same point and should be in the same position once the transformation is applied.

Figure 10:
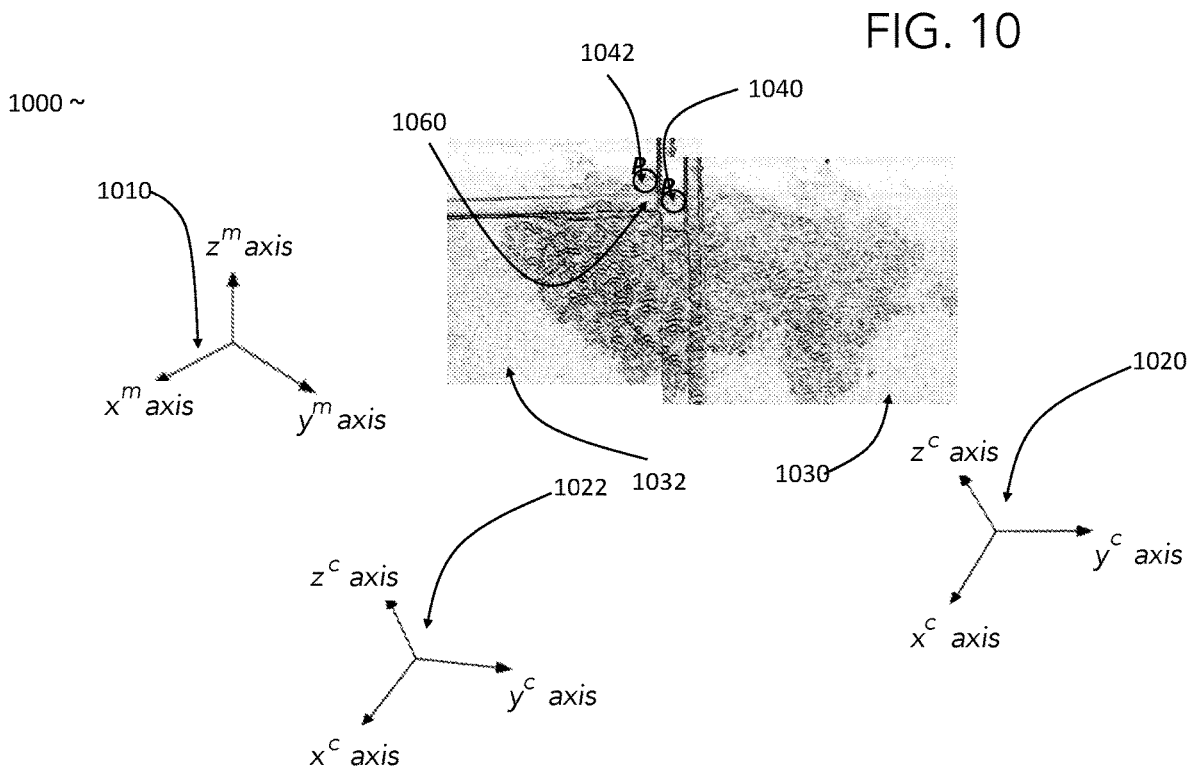
FIG. 10 is an image depicting mis-alignment between the points identified in FIG. 8 and FIG. 9 that results from a homogeneous transformation matrix that does not accurately capture the motion.

FIG. 10 is a drawing of the situation in which the homogeneous transformation matrices failed to transform a corresponding point to the same location. In this example, there are two three-dimensional images 1030 and 1032. The point 1040 in image 1030 is in the coordinate system 1010 ($x^m$, $y^m$, and $z^m$ axes). The point 1040 has a corresponding point 1042 in image 1032 that is also in the coordinate system 1010 ($x^m$, $y^m$, and $z^m$ axes). The point 1040 was transformed from the original coordinate system 1020 ($x^c$, $y^c$, and $z^c$ axes) into the coordinate system 1010 ($x^m$, $y^m$, and $z^m$ axes). The point 1042 was transformed from the original coordinate system 1022 ($x^c$, $y^c$, and $z^c$ axes) into the coordinate system 1010 ($x^m$, $y^m$, and $z^m$ axes). However, because of limitations in the motion tracking capability of the MTS from FIG. 2, the transformation has an error 1060. To reduce this error, an additional step is required.

Figure 11:
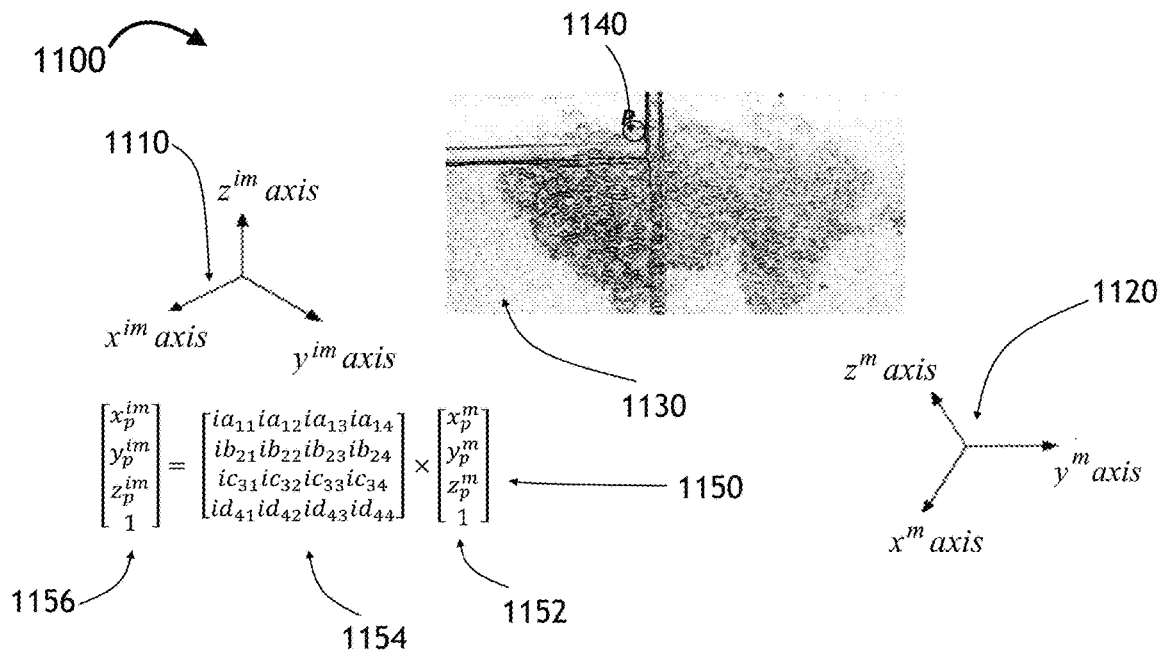
FIG. 11, in a style similar to that of FIG. 10, illustrates an improved alignment that results from the improved homogenous transformation matrix.

FIG. 11 is a drawing that illustrates a fine alignment process 1100 that reduces error, produces both a better three-dimensional image and provides for better motion tracking. Because the three-dimensional images in FIG. 10, images 1030 and 1032, are of a rigid structure and have overlapping regions, the corresponding points in each images can be used to better align the images 1030 and 1032 from FIG. 10. The process of this alignment produces a new homogenous transformation matrix, HTm→im 1154. The location of the point 1152 is transformed from the initially aligned position in the coordinate system 1120 ($x^m$, $y^m$, and $z^m$ axes) to a more accurately aligned position in coordinate system 1110 ($x^{im}$, $y^{im}$, and $z^{im}$ axes). The calculation of the homogenous transformation matrix HTm→im 1154 can be accomplished by establishing a cost function designed to minimize the summation of the total error between corresponding points between the two overlapping three-dimensional images. In this case, the homogenous transformation matrix HTr→m provides an initial alignment between two scans that is improved using the fine alignment process 1100. This results in better alignment in the three-dimensional data 1130, more accurate alignment of corresponding points 1040 and better motion tracking.

Figure 12:
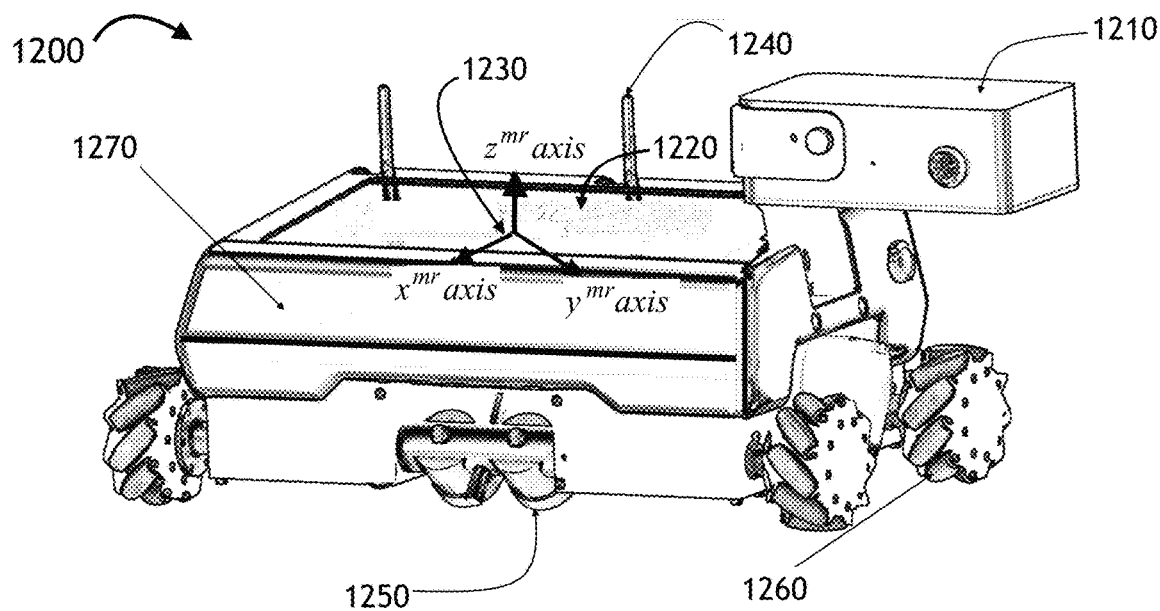
FIG. 12 is an isometric perspective illustrating a system of the invention in which a mobile robotic platform is employed eliminating necessity of a human operator during scanning surface-analysis operations.

FIG. 12 is a drawing of a mobile robotic approach 1200. In this embodiment, a human operator (such as shown at 160, FIG. 1) is not required. Rather, a mobile robotic vehicle 1270 is employed to support the 3DIS 1210, to which a rigid body for motion tracking 1220 may be mounted rigidly, or as shown mounted directly to the mobile robotic vehicle 1270. The rigid body for motion tracking 1220 with 1230 ($x^{mr}$, $y^{mr}$, and $z^{mr}$ axes) is incorporated into the design of the robot but could be placed anywhere on the mobile robotic vehicle 1270 or the 3DIS 1210. Communication to the system controller 140 of FIG. 1 is accomplished via a wireless link 1240. The mecanum wheels 1260 provide for omni-directional travel across a wide range of surfaces. The permanent magnets 1250 allow the mobile robotic vehicle 1270 to adhere to steel structures. The use of a mobile robotic vehicle 1270 offers significant advantages compared to a human operator. The mobile robotic vehicle 1270: 1) can traverse locations that may be dangerous for human operators; 2) can be configured with additional capability (e.g. welding capability, cleaning capability); 3) can be configured with a control loop that uses the enhanced motion tracking capability to perform pre-defined tasks. For example, a conventional PID (proportional-integral-differential) control system could use the motion tracking information to allow the mobile robotic vehicle 1270 to maintain motion along a pre-defined path and simultaneously perform additional functions (e.g. welding, cutting, non-destructive testing).

Figure 13:
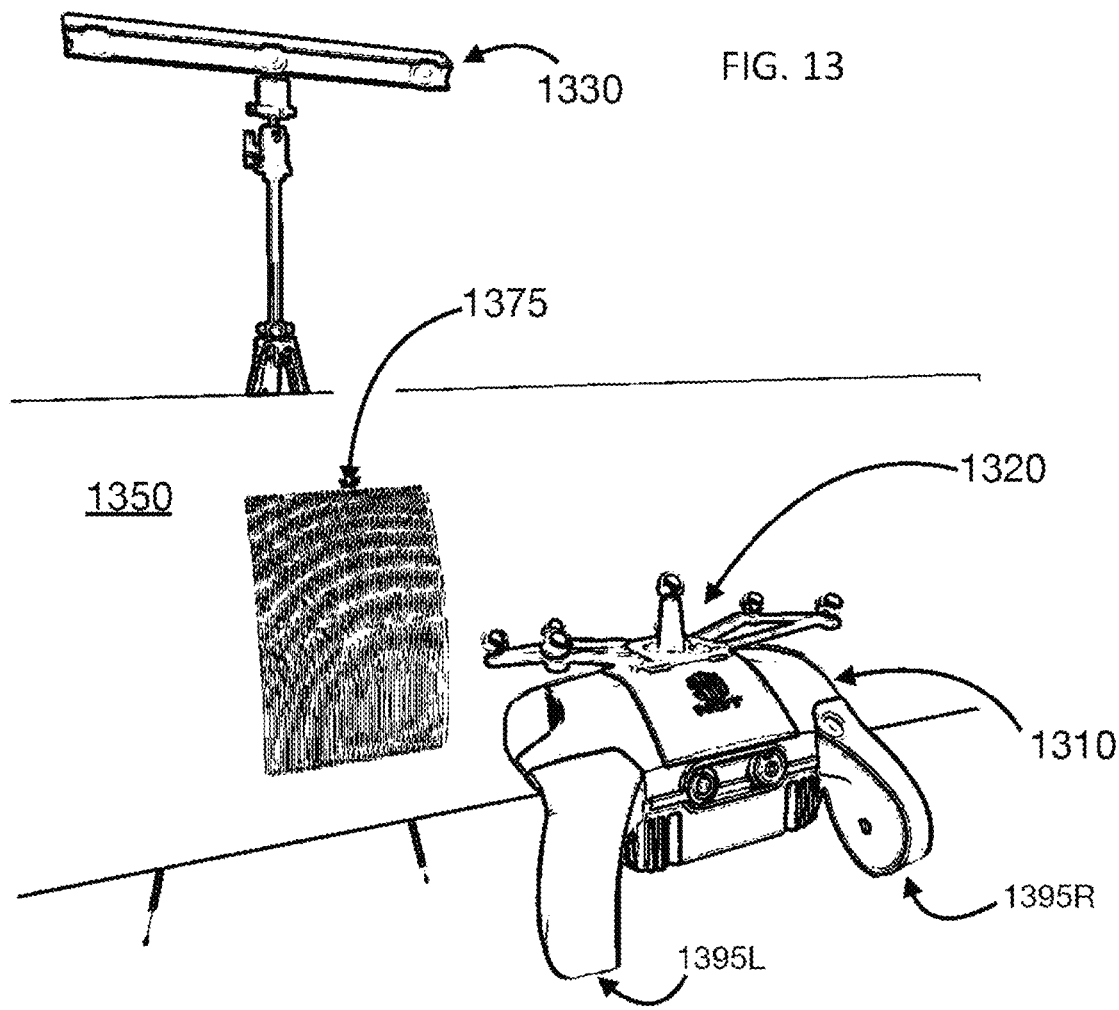
FIG. 13 includes an alternative embodiment with features analogous to those illustrated in FIGS. 1 and 7, adapted for enhanced-accuracy, real-time motion tracking and 3-dimensional image acquisition for an area under analysis or inspection, here, a cylindrical or other shape, outer surface 1350.

FIG. 13 includes an alternative embodiment with features analogous to those illustrated in FIGS. 1 and 7, adapted for enhanced-accuracy, real-time motion tracking and 3-dimensional image acquisition for an area under analysis or inspection, here, a cylindrical or other shape, outer surface 1350.

Figure 14:
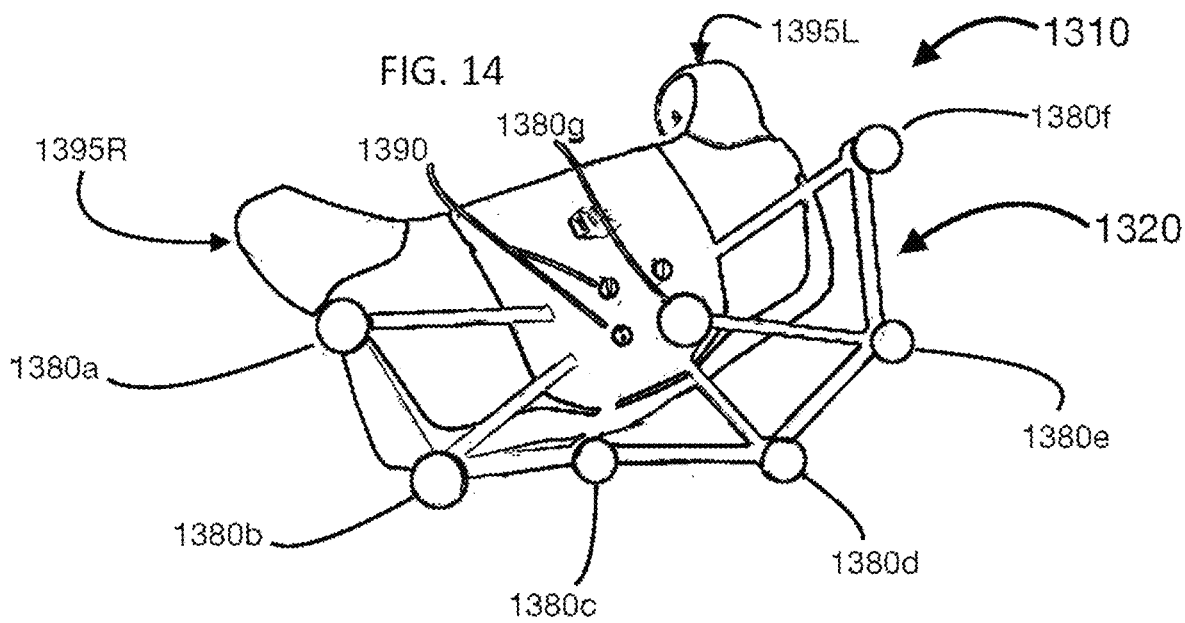
FIG. 14 includes further detail of alternative embodiment 3DIS unit 1310 shown also in FIG. 13, adapted to perform acquisition of 3-dimensional image data in a manner such as those shown and described elsewhere.

FIG. 14 includes further detail of alternative embodiment 3DIS unit 1310 shown also in FIG. 13, adapted to perform acquisition of 3-dimensional image data in a manner such as those shown and described elsewhere.

Figure 15:
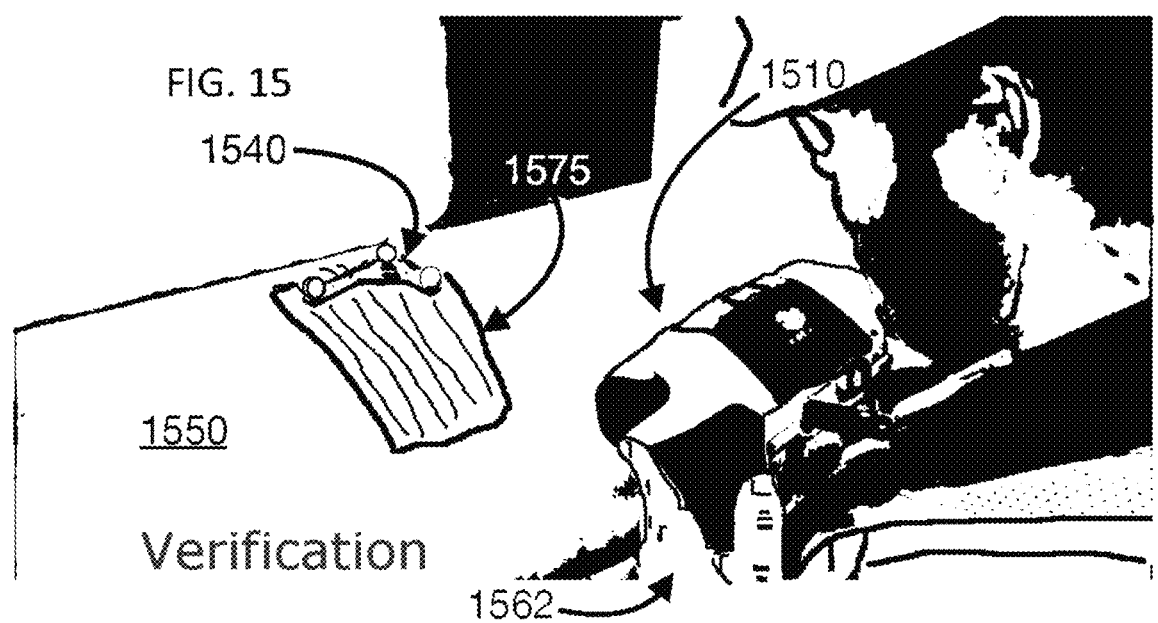
FIG. 15 depicts 3DIS unit 1510 held by operator 1560 undergoing calibration by projecting structured light over an area 1575 within with rigid body offset calibration target 1540 has been located.

FIG. 15 depicts 3DIS unit 1510 held by operator 1560 undergoing calibration by projecting structured light over an area 1575 within with rigid body offset calibration target 1540 has been located.

Figure 16:
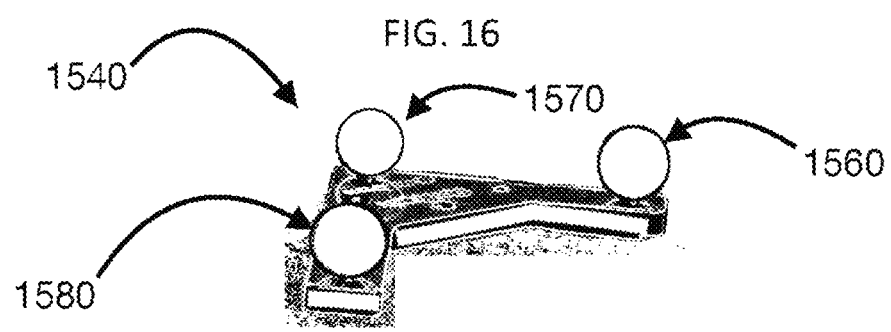
FIG. 16 is a close-up of rigid body offset calibration target 1540 depicted in FIG. 15 sitting atop a surface under analysis or inspection.

FIG. 16 is a close-up of rigid body offset calibration target 1540 depicted in FIG. 15 sitting atop a surface under analysis or inspection.

Figure 17:
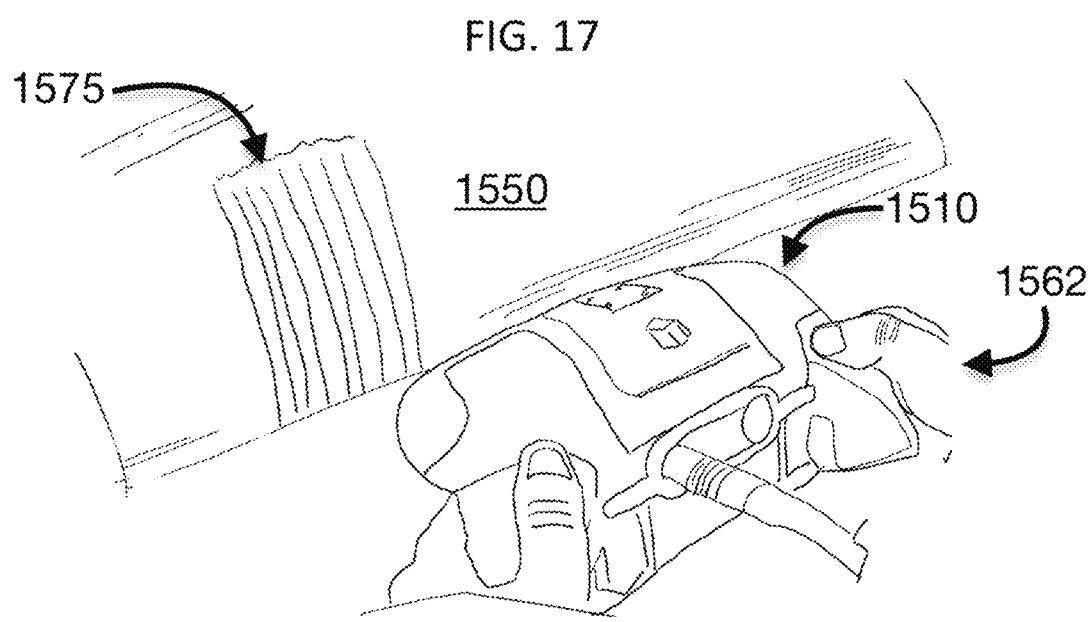
FIG. 17 depicts 3DIS unit 1510 of FIG. 15 whereby structured light illuminates an area 1575 of surface under analysis or inspection 1550 during scanning of the surface.

FIG. 17 depicts 3DIS unit 1510 of FIG. 15 whereby structured light illuminates an area 1575 of surface under analysis or inspection 1550 during scanning of the surface.

Figure 18:
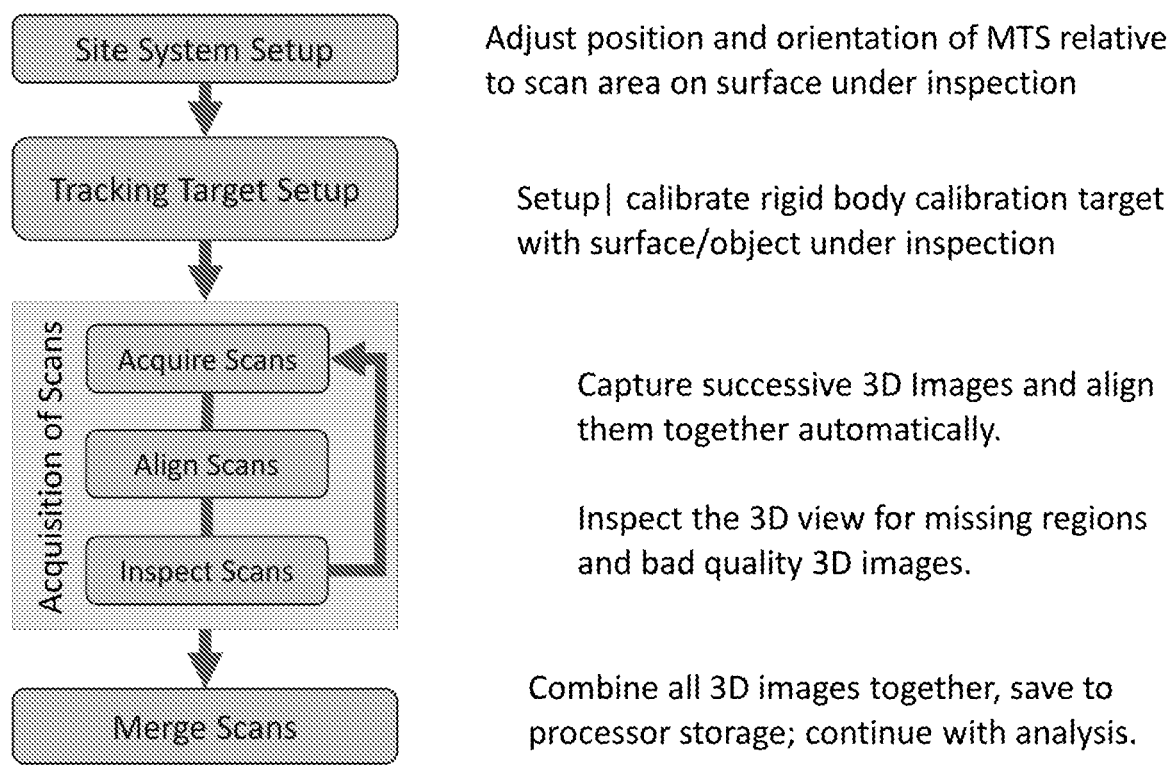
FIG. 18 outlines steps carried out in a typical process employing features of the invention to calibrate, capture successive 3D images of the surface under analysis or inspection, and combine—or stitch—the scanned image data together.

FIG. 18 outlines steps carried out in a typical process employing features of the invention to calibrate, capture successive 3D images of the surface under analysis or inspection, and combine—or stitch—the scanned image data together.

FIGS. 19 and 20 schematically depict features of the invention, in particular, elements from other figures are referenced to provide an overall understanding of the genius of the method/process, system, and employment of conventional elements along with new and unique features and components of the invention.

The flow diagram in FIG. 21 details steps of process 2100 that employ new and unique components to carry out innovative computational process steps according to the invention. Each step 2102, 2104, 2106, 2108, 2112, 2114, 2116, 2118, 2126, 2128, 2134, along with feedback arrow 2136, itemizes and references elements featured throughout the drawings and as described, to highlight applicants' unique innovation.

As depicted and explained throughout, the MTS tracks the Rigid Body (such as alternatives labeled 120, 320, 420, 620, 1220, 1320) and associated Markers (for example, FIG. 3 at 330, 340, 350, 360, 370, 380 and the seven markers shown in FIG. 14 at 1380a-g) fixed thereon to locate positions of the Markers in the Global Coordinate system (identified as W or w in FIGS. 19, 20, 21). The relationship between the Rigid Body and the 3DIS is determined in order to transform the 3D imaging data from the 3DIS (for example, reference has been made to point out transformations T using subscript 3DIS) coordinate system into the world (w) coordinate system, see once again, FIGS. 19, 20, 21. This relationship between Rigid Body and 3DIS is expressed in terms of the transformation matrix $_{RB}T_{3DIS}$. The transformation matrix $_{RB}T_{3DIS}$ is calculated during a setup procedure that defines the relationship between the 3DIS imaging coordinate system and the Rigid Body's coordinate system, as referenced in the flow diagram labeled in FIG. 18 as well as FIG. 21 at 2100.

FIG. 19 shows the relationship of four different coordinate systems, here depicted as (x, y, and z axes), as well as how the unknown homogeneous transformation matrix $_{RB}T_{3DIS}$ is constructed. A matrix referenced as $_{W}T_{Cal}$ is the transform from Rigid Body Offset Calibration System to the Global Coordinate System (w). Matrix $_{Cal}T_{3DIS}$ is the transform from the 3DIS coordinate system depicted as (x, y, and z axes) to the Calibration Rigid Body's coordinate system, also depicted as (x, y, and z axes). Matrix $_{W}T_{RB}$ is the transform from Rigid Body (RB) Coordinate System to the Global Coordinate System (w). The arrows paired with each transform demonstrates the direction that the transform moves 3D data obtained/captured. Both Transforms that involve the Global Coordinate System (w) $_{W}T_{Cal}$ and $_{W}T_{RB}$ are provided by the MTS. Matrix $_{Cal}T_{3DIS}$ is constructed from 3D image data from the 3DIS using an algorithm that extracts the Rigid Body Offset Calibration Target's coordinate system depicted as (x, y, and z axes). The expression shown at 2400 represents a technique for calculating the unknown $_{RB}T_{3DIS}$ transform.

FIG. 20 describes the process for how individual 3D "point clouds" of 3D data/information is captured by the 3DIS and then positioned in the global coordinate system (w). As an example, there are two point clouds labeled point cloud #1 (Pc1) and point cloud #2 (Pc2) that are being 'moved' into respective global positions. The transforms $_{W}T_{RB1}$ and $_{W}T_{RB2}$ represent that global (w) positions of the 3DIS when each scan was acquired. In the prior Calibration or Offset Calculation step (see, also FIGS. 18, 19, 21) the $_{RB}T_{3DIS}$ transform was calculated. It is shown by way of both equations/expression 2501 and 2502 that the shared transform $_{RB}T_{3DIS}$ is the same, with the only difference being the World Coordinate transforms (w). In expression 2501, point cloud #1 is moved to the global position in 2510, and similarly the 2502 point cloud #2 is located to it's global position.

EXAMPLES of the unique preferred and alternative structures and features are shown and described throughout. And, while certain representative embodiments and details have been shown for the purpose of illustrating the invention, those skilled in the art will readily appreciate that various modifications, whether specifically or expressly identified herein, may be made to these representative embodiments without departing from the novel core teachings or scope of this technical disclosure. Accordingly, all such modifications are intended to be included within the scope of the claims. Although the commonly employed preamble phrase "comprising the steps of" may be used herein, or hereafter, in a method claim, the applicants do not intend to invoke any statutory section in a manner that unduly limits rights to the claimed invention. Furthermore, in any claim that is filed herewith or hereafter, any means-plus-function clauses used are intended to cover at least all structure(s) described herein as performing the recited function and not only structural equivalents but also equivalent structures.

We claim:

1. A method for tracking motion of an object using a motion tracking system defining a global coordinate system, comprising:
   (a) acquiring, with aid of a 3-D imaging system to which the object has been attached, a high-resolution three-dimensional image at a first position of successive positions of a scene under inspection and applying a first transformation matrix, generated by the motion tracking system, to locate the three-dimensional image at said first position into the global coordinate system, said 3-D imaging system and said motion tracking system in communication with a computerized controller;
   (b) said first transformation matrix having been determined by combining a first transform from an object coordinate system to the global coordinate system and a transform from said 3-D imaging system to said object coordinate system;
   (c) acquiring, with aid of said 3-D imaging system, a high-resolution three-dimensional image at a second position of the successive positions and applying a second transformation matrix, generated by the motion tracking system, to locate the three-dimensional image at said second position into the global coordinate system;
   (d) said second transformation matrix having been determined by combining a second transform from an object coordinate system to the global coordinate system and said transform from said 3-D imaging system to said object coordinate system;
   (e) establishing a cost function for addressing error comprising determining an alignment transformation matrix utilizing data from the high-resolution three-dimensional images acquired at the first and second position; and
   (f) applying said alignment transformation matrix to adjust a detected position by the motion tracking system along a path of the object.

2. The method of claim 1 in which the motion tracking system utilizes an optical flow technique.

3. The method of claim 1 further comprising mounting said 3-D imaging system to which the object has been attached, to a mobile robotic vehicle.

4. The method of claim 1 in which the object which has been mounted to said 3-D imaging system and is a handheld unit; and further comprising projecting structured light to illuminate said scene under inspection.

5. The method of claim 1 in which at least one three-dimensional marker has been affixed to the object which has been mounted to said 3-D imaging system.

6. The method of claim 5 further comprising the motion tracking system obtains an estimate of motion by tracking said at least one three-dimensional marker using two-dimensional images acquired by a plurality of cameras.

7. The method of claim 1 further comprising adapting a mobile robotic vehicle to transport the 3-D imaging system to which the object has been attached.

8. The method of claim 7 further comprising: mounting said 3-D imaging system to said mobile robotic vehicle; providing wireless communication between said 3-D imaging system and said computerized controller; and providing additional capability for said mobile robotic vehicle to perform a function selected from the group consisting of welding, cleaning, cutting, and non-destructive testing.

9. The method of claim 7 further comprising providing proportional-integral-differential control tracking capability utilizing said adjusted detected position of the object for directing the motion of the mobile robotic vehicle along a pre-defined path.

10. A system for tracking motion of an object using a motion tracking system defining a global coordinate system, comprising:
    (a) a 3-D imaging system to which the object has been attached, for acquiring a high-resolution three-dimensional image of a scene under inspection at a first and second position of successive positions;
    (b) said 3-D imaging system and the motion tracking system in communication with a computerized controller;
    (c) a first transformation matrix, generated by the motion tracking system, determined by combining a first transform from an object coordinate system to the global coordinate system and a transform from said 3-D imaging system to said object coordinate system;
(d) said first transformation matrix applied to locate the three-dimensional image acquired at said first position into the global coordinate system;
(e) a second transformation matrix, generated by the motion tracking system, determined by combining a second transform from an object coordinate system to the global coordinate system and a transform from said 3-D imaging system to said object coordinate system;
(f) said second transformation matrix applied to locate the three-dimensional image acquired at said second position into the global coordinate system;
(g) a cost function established for addressing error comprising an alignment transformation matrix utilizing data from the high-resolution three-dimensional images acquired at the first position and second position; and
(h) said computerized controller to apply said alignment transformation matrix to adjust a detected position by the motion tracking system along a path of the object.

11. The system of claim 10 wherein said 3-D imaging system to which the object has been mounted is a handheld unit; and whereby said 3-D imaging system projects structured light to illuminate said a scene under inspection.

12. The system of claim 10 in which at least one three-dimensional marker has been affixed to the object which has been mounted to said 3-D imaging system.

13. The system of claim 12 in which the motion tracking system comprises a plurality of cameras for tracking said at least one three-dimensional marker using two-dimensional images acquired by said plurality of cameras to obtain an estimate of motion.

14. The system of claim 10 further comprising a mobile robotic vehicle adapted to transport the 3-D imaging system to which the object has been attached.

15. The system of claim 14 further comprising: a wireless communication between said 3-D imaging system and said computerized controller; and a proportional-integral-differential controller to direct, utilizing said adjusted detected position of the object, the motion of said mobile robotic vehicle along a pre-defined path.

* * * * *